J. F. PALMER.
RESILIENT RING OR ANNULUS AND METHOD OF MAKING THE SAME.
APPLICATION FILED MAR. 20, 1918.
1,352,470. Patented Sept. 14, 1920.
Fig. 1.
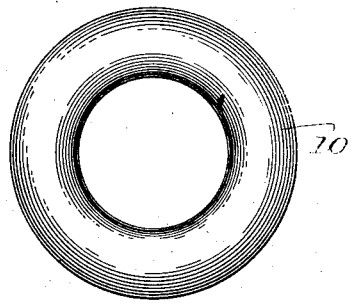
Fig. 2.  Fig. 3.  Fig. 4.
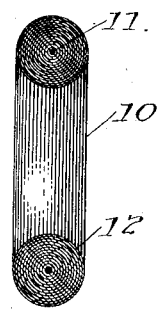 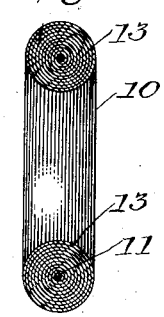 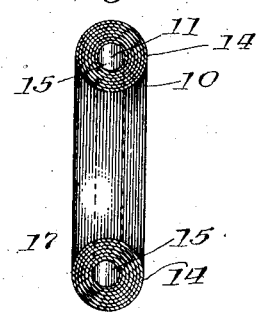
Fig. 5.
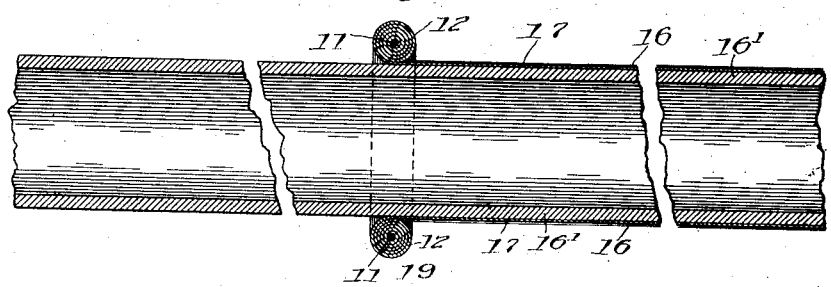
Inventor
John F. Palmer,
by Chas. L. Lord
Atty.

UNITED STATES PATENT OFFICE.

JOHN FULLERTON PALMER, OF ST. JOSEPH, MICHIGAN.

RESILIENT RING OR ANNULUS AND METHOD OF MAKING THE SAME.

1,352,470.      Specification of Letters Patent.     Patented Sept. 14, 1920.

Application filed March 20, 1918. Serial No. 223,557.

*To all whom it may concern:*

Be it known that I, JOHN FULLERTON PALMER, a citizen of the United States, residing at St. Joseph, in the county of Berrien and State of Michigan, have invented certain new and useful Improvements in Resilient Rings or Annuli and Methods of Making the Same, of which the following is a full, clear, and exact specification.

My invention relates to an improved form of resilient ring or annulus capable of general use in a number of different arts, and also to the method of making such a ring or annulus.

My improved ring or annulus is intended primarily for use as a tool or circular roller compressor for the purpose of exerting a great pressure radially inwardly or outwardly, or both, against the surface or surfaces of a cylindrical member or members, while permitting a relatively free movement of the annulus axially of said cylindrical member or members. It must be understood, of course, that the resilient ring or annulus may be employed as a circular roller bearing, a rotatable packing or bushing, and in many ways that will be readily apparent.

The main object of my invention is to simplify and render more efficient and effective apparatus and devices employing relatively movable curved surfaces which normally coöperate with considerable friction and loss.

A further object is to reduce the expense of, and eliminate many steps in the well known processes of manufacture where special tools and considerable hand labor are required to exert pressure upon a cylindrical or other curved surface.

The invention, therefore, in one of its aspects, comprises a resilient ring or annulus capable of rotating about its own circular axis, and having the stresses therein so nearly balanced as to be readily rotatable thereon or such that it will maintain a substantially stable equilibrium in any position in which it is left after having been rotated about said circular axis. The ring is preferably made of layers or laminæ of thin resilient material, such as vulcanized rubber, built up around a circular axis, so that the material in each layer or lamina is substantially equidistant from said circular axis, and the stresses in said layer or lamina are practically balanced. The layers or laminæ may be united in any desired manner, such, for instance, as by means of a resilient cement.

My invention comprises, further, the method of making an annulus, which consists of forming a tube or cylinder of thin resilient material, coating same with a layer of resilient cement or otherwise rendering the surface adhesive, and rolling said material into annular form about a circular axis.

My invention will be more clearly understood by reference to the accompanying drawings, of which—

Figure 1 is a side elevation of my improved annulus of resilient material;

Figs. 2, 3, and 4 are, respectively, sectional elevations of three modifications of the annulus; and, Fig. 5 is a sectional elevation of the apparatus used to carry out the preferred method of forming the improved annulus, the annulus being shown partially completed.

Referring to the drawings, it will be seen that my improved ring or annulus 10 has the appearance of the common doughnut. If, however, an attempt should be made to rotate the common doughnut about its own circular axis it would break into pieces. If the ring or annulus should be rendered expansible by being made of solid rubber molded into the desired form and vulcanized, it would be very difficult to rotate same about its own circular axis, because the unbalanced stresses in the material would tend to force the resilient material back into its initial form or shape.

In order to overcome the tendency for an expansible annulus of resilient material to return to its initial position when rotated about its own circular axis, and to permit such a a rolling or rotating movement without resistance other than friction, I have formed my improved annulus of thin laminæ or layers of resilient material, such as vulcanized rubber, the material of each lamina or layer being substantially equidistant from the circular axis 11 of the annulus.

In the form shown in Fig. 2, the laminæ or layers 12 are arranged concentrically around said circular axis 11, while in the form shown in Fig. 3 the laminæ 13 are arranged spirally, that is, they present a spiral cross section. In the forms shown in Figs. 2 and 3 the laminæ extend from the circular axis to the surface of the annulus. In Fig. 4, however, the laminæ 14 are built up spirally about the circular axis in such a manner as to form a hollow core 15. The laminæ or layers are united into a practically unitary structure by rendering the surface of thin resilient material adhesive, such, for instance, as by an application of resilient cement 16. It will thus be seen that in the various forms of my improved annulus shown in the drawings, on account of the laminated construction, the stresses set up in any individual lamina or layer are practically balanced, and the stresses in the entire unitary structure are practically balanced so that the annulus will maintain a substantially stable equilibrium in any position into which it may be rotated about its own circular axis 11.

On account of its relatively simple and inexpensive construction, I prefer to use the form shown in Fig. 3. In making this form I prefer to employ a long tube or cylinder 16 (Fig. 5), on which is formed a thin coating of resilient material 17, such as rubber, which is afterward vulcanized, and then rendering the surface of this material adhesive, such, for instance, as by the application of a resilient cement, and then rolling the material along the cylinder 16 into an annular form about a circular axis 11ª. In Fig. 5, the annulus is shown at 19 partially rolled up, it being understood that the tube may be made as long as required to obtain the desired size and shape of annulus. It should be understood, furthermore, that the thinner the layers or laminæ of resilient material, the more nearly perfect will be the completed annulus.

Although I have illustrated and described certain forms of improved annulus, and a method of forming the same, it must be understood that many modifications and changes may be made without departing from the spirit of the invention, or its scope, as set forth in the appended claims.

What I claim as new is:

1. An expansible annulus made of thin layers of vulcanized rubber built up around a circular axis, the individual layers having smooth interior and exterior surfaces and being united intimately to form a practically unitary structure.

2. The method of making an annulus of resilient material in which the stresses are practically balanced, which consists of forming a tube or cylinder of a thin layer of rubber having smooth inner and outer surfaces, vulcanizing said tube or cylinder, rendering the surface of the vulcanized rubber adhesive, and rolling said tube or cylinder into an annular form about a circular axis with the entire surfaces of adjacent layers of rubber in intimate contact.

3. A tool for use as a roller compressor in the form of an annulus of resilient material whereby the stresses are practically balanced, said annulus being rollable along its circular axis during its working movement.

4. A tool for use as a roller compressor formed from a cylinder of fully vulcanized rubber by winding into an annulus whereby the stresses are practically balanced, said tool being rollable along its own circular axis during its working movement.

5. An annular tool in the form of a resilient member rollable along its own circular axis and in which the stresses opposed to its rolling action are practically balanced.

In testimony whereof I affix my signature.

JOHN FULLERTON PALMER.